J. G. HALE.
HAY PRESS.
APPLICATION FILED DEC. 19, 1910.
991,438.
Patented May 2, 1911.
2 SHEETS—SHEET 1.
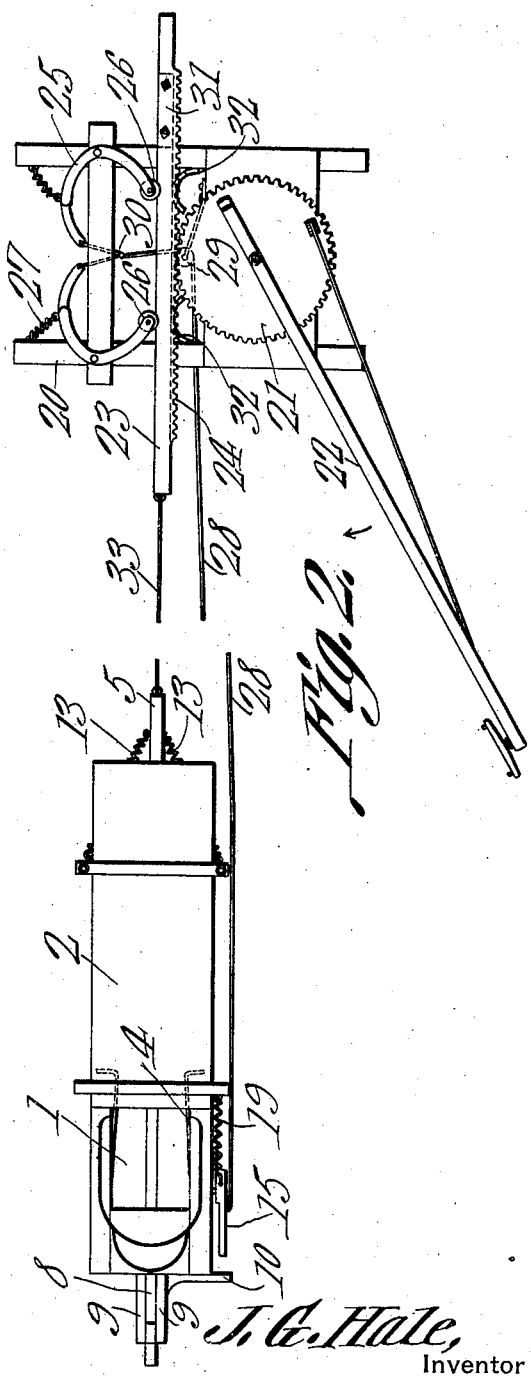
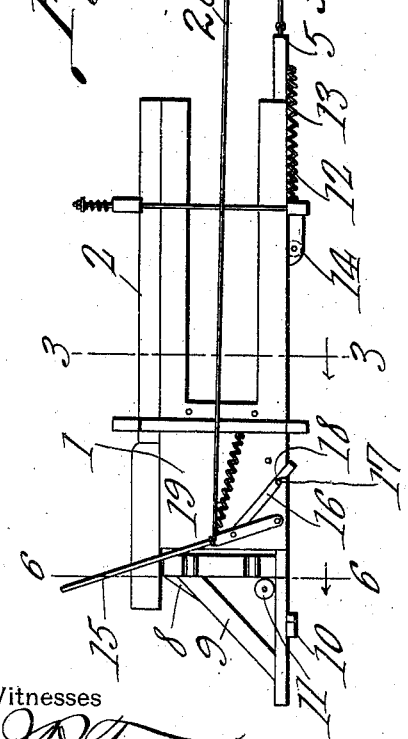
Witnesses
J. G. Hale,
Inventor
by C. A. Snow & Co.
Attorneys J. G. HALE.
HAY PRESS.
APPLICATION FILED DEC. 19, 1910.
991,438.
Patented May 2, 1911.
2 SHEETS—SHEET 2.
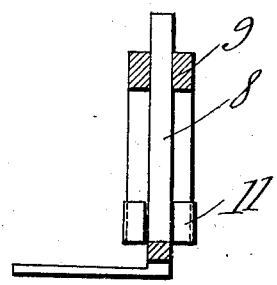
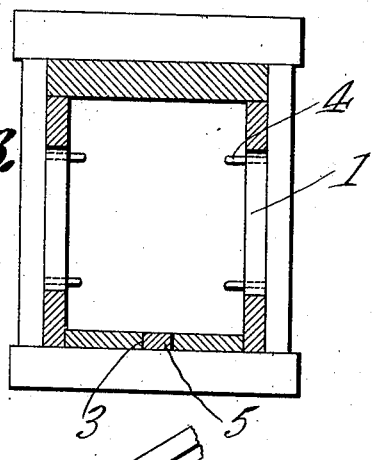
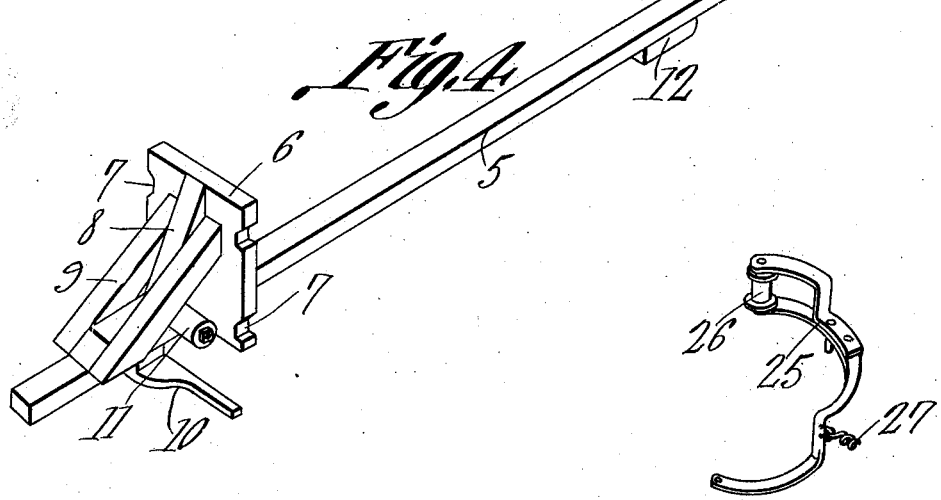
Witnesses
Inventor J. G. Hale,
by C. A. Snow & Co.
Attorneys

UNITED STATES PATENT OFFICE.

JOHN GARLAND HALE, OF PENDERGRASS, GEORGIA, ASSIGNOR OF ONE-HALF TO JAMES M. LONG, OF PENDERGRASS, GEORGIA.

HAY-PRESS.

991,438.　　　　　Specification of Letters Patent.　　Patented May 2, 1911.

Application filed December 19, 1910. Serial No. 597,978.

*To all whom it may concern:*

Be it known that I, JOHN G. HALE, a citizen of the United States, residing at Pendergrass, in the county of Jackson and State of Georgia, have invented a new and useful Hay-Press, of which the following is a specification.

This invention has relation to hay presses and consists in the novel construction and arrangement of its parts as hereinafter described and claimed.

The object of the invention is to provide a hay press of simple structure in which the plunger is pulled upon its active stroke and is not pushed as is usually the case.

With this object in view the press includes a baling box in which the plunger is mounted for reciprocation and a sweep mechanism of especial construction with means mounted upon the baling box and adapted to be automatically operated by the plunger to permit the plunger pulling bar to become disengaged from the mast wheel of the sweep mechanism so that the said bar will retract as the plunger is retracted in the baling box.

In the accompanying drawing,—Figure 1 is a side elevation of the hay press. Fig. 2 is a top plan view of the same. Fig. 3 is a transverse sectional view of the same cut on the line 3—3 of Fig. 1. Fig. 4 is a perspective view of the plunger of the press. Fig. 5 is a perspective view of an arm forming a part of the sweep mechanism. Fig. 6 is a transverse sectional view of a portion of the press cut on the line 6—6 of Fig. 1.

The press consists of a baling box 1 which is provided at one end with a compression or baling chamber 2 of usual form. The baling box 1 is provided in its bottom with a channel 3 which also extends throughout the length of the compression chamber 2. The box 1 is also provided in its sides with spring arms 4 of usual form which are adapted to encounter the hay as it is compressed by the plunger (to be described) and prevent the said hay from following the plunger in a backward direction as the said plunger retracts. A plunger bar 5 is slidably mounted in the channel 3 and a plunger 6 is fixed to the end portion of the said bar. The said plunger is arranged to traverse the length of the baling box 1 and is provided in its side edges with notches 7 adapted to receive the arms 4 during the reciprocatory movement of the said plunger. An abutment piece 8 is located behind the plunger 6 and is also connected with the plunger bar 5. Braces 9 bear at their upper ends against the outer side of the plunger 6 and at their lower ends are attached to the plunger bar 5. An arm 10 is fixed to the end portion of the plunger bar 5 and its end portions lie in a lower plane than the lower surface of the bottom of the baling box 1 and the end portion of the said arm 10 projects beyond the vertical plane of the outer surface of the side of the baling box 1. Rollers 11 are journaled to the abutment piece 8 and are adapted to travel upon the upper surface of the bottom of the baling box 1 at the opposite sides of the channel 3 formed therein. A stop block 12 is fixed to the under side of the plunger bar 5 and when the said bar retracts said block is adapted to engage the forward edge of the compression chamber 2 and limit the retractive movement of the said bar 5. Return springs 13 are connected at one end with the end portion of the compression chamber 2 and at their other ends are connected with the plunger bar 5. The compression chamber 2 may be provided in its bottom with one or more rollers 14 upon which the plunger 5 may travel thereby reducing friction. A lever 15 is fulcrumed upon the side of the baling box 1 and a catch 16 is pivotally connected with the said lever. A pin 17 is fixed to the side of the baling box 1 and the said catch is provided with a notch 18 which at times receives the said pin and when in such position the lower portion of the catch 16 is in the path of movement of the outer portion of the arm 10. A spring 19 is connected at one end with the lever 15 and at its other end to the side of the baling box 1. The spring 19 is under tension with a tendency to draw the free end of the lever 15 toward the compression chamber 2.

In combination with the press as hereinbefore described, a sweep mechanism of especial design is provided and the said mechanism includes a frame 20 upon which is journaled a master gear wheel 21. A sweep 22 is fixed at its inner end to the gear wheel 21 and draft animals or a draft animal is adapted to be hitched to the outer end of the said sweep. A bar 23 is slidably mounted upon the frame 20 and is provided at one side with a series of gear teeth 24 which at 110 times mesh with the teeth carried by the master wheel 21. Arms 25 are pivoted upon the frame 20 and at their inner ends are provided with rollers 26 which bear against the edge of the bar 23. Springs 27 are connected at one end with the arms 24 and at their other ends are attached to the frame 20. The said springs 27 are under tension with a tendency to draw those portions of the arms 25 with which they connect toward the frame 20 at the points where their other ends connect with the frame. A cable 28 is connected at one end with the lever 15 and extends to the frame 20 and is trained around a pulley 29 journaled upon the said frame and at its other end the said cable 28 is provided with branches 30 to each of which is attached an end of one of the arms 25. A stop block 31 is fixed to the under side of the bar 23 at times is adapted to engage the side of the frame 20 and limit the longitudinal movement of the said bar 23. Springs 32 are attached to the frame 20 and at their free end portions bear against the side of the bar 23 and under tension with a tendency to force the said bar 23 away from the center of the master wheel 21.

In operation, the draft animal is hitched to the sweep 22 and driven around in a circular path as usual. The hay is pitched into the baling box 1 and when enough hay has been placed therein, an operator swings the lever 15, so that the catch 16 is moved and its notch 18 receives the pin 17. The cable 28 is moved longitudinally and the arms 25 are swung upon their pivots whereby the rollers 26 force the bar 23 toward the master wheel 21 and the teeth 24 of the said bar 23 becomes enmeshed with the teeth upon the said master wheel. As the master wheel 21 rotates with the sweep 22 the bar 23 is moved longitudinally away from the compression chamber 2 of the press. A cable 33 connects the bar 23 with the bar 5 and consequently the bar 5 is moved longitudinally within the baling box 1 and compression chamber 2. This moves the plunger so that the hay deposited in the baling box 1 is compressed in the compression chamber 2 in the usual manner. When the arm 10 which is carried by the bar 5 comes in contact with the lower end portion of the catch 16, the said catch is swung so that its notch 18 disengages the pin 17 and the tension of the spring 19 comes into play, swings the lever 15 and moves the notch 18 of the catch 16 beyond the pin 17. Therefore, the cable 28 is rendered slack and the springs 27 swing the arms 25 so that the rollers 26 are carried away from the bar 23. At the same time the tension of the springs 32 forces the bar 23 away from the master wheel 21 and the teeth 24 of the bar are carried out of engagement with the teeth of the said master wheel. As soon as the teeth 24 disengage the teeth of the master wheel 21 the tension of the spring 13 comes into play and moves the bar 5 longitudinally which in turn retracts the plunger 6 in the baling box 1. Through the connecting cable 33 the bar 23 is moved longitudinally until its stop 31 comes into contact with the side of the frame 20. The bar 5 is also checked in its retractive movement by the stops 12 coming in contact with the end portion of the compression chamber 2. The above operation is repeated as often as the baling box 1 is filled with hay until the bale is completed in the compression chamber 2.

Having described the invention, what I claim as new and desire to secure by Letters Patent is:

1. A baling press comprising a box, a plunger mounted for reciprocatory movement in the box, an arm carried by the plunger, a lever fulcrumed upon the box, a catch carried by the lever, means for retaining said catch mounted upon the baling box, said catch when retained having an end portion projecting into the path of movement of said arm, a sweep mechanism, a bar mounted for reciprocation upon the sweep mechanism and adapted at times to engage the active element of the sweep mechanism, holding means for said bar and means operatively connecting the said holding means with the lever upon the baling box to release the said holding means.

2. A press comprising a baling box, a plunger mounted for reciprocation therein, an arm carried by the plunger, a lever fulcrumed upon the baling box, a spring connected with the lever, a latch pivoted to the lever, said latch having a notch, a pin mounted upon the baling box and adapted to be received by the notch in the latch, said latch when in engagement with the said pin having an end portion projecting into the path of movement of the arm mounted upon the plunger, a sweep mechanism including a master wheel, a bar mounted for reciprocation upon the sweep mechanism and operatively connected with the plunger, means for normally holding the said bar out of engagement with the master wheel, arms pivoted upon the sweep mechanism, springs connected to said arms, means operatively connecting the arms with the lever upon the baling box to cause the said arms to engage the bar upon the sweep mechanism and force the same into engagement with the master wheel when the latch carried by the lever upon the baling box is in engagement with the pin mounted upon the baling box.

3. A press comprising a baling box, a plunger mounted for reciprocation therein, an arm carried by the plunger, a lever fulcrumed upon the baling box, a spring connected to said lever, a latch pivotally connected to the lever and having a notch, a pin mounted upon the baling box and adapted to enter the notch in the latch, said latch when in engagement with the pin having an end portion projecting into the path of movement of the arm carried by the plunger, a sweep mechanism including a frame, a bar mounted for reciprocation upon the said frame, and operatively connected with the plunger, a master wheel journaled upon the frame, springs bearing against the bar upon the sweep mechanism and normally holding the said bar away from the periphery of the said wheel, arms pivoted upon the sweep mechanism and having rollers which bear against the side of the said bar, means operatively connecting said arms with the lever upon the baling box whereby the said arms hold the bar in engagement with the periphery of the master wheel, springs for withdrawing the said arms when released, and retracting means for the plunger.

In testimony that I claim the foregoing as my own, I have hereto affixed my signature in the presence of two witnesses.

JOHN GARLAND HALE.

Witnesses:
TED APPLEBY,
E. DUKE.

Copies of this patent may be obtained for five cents each, by addressing the "Commissioner of Patents, Washington, D. C."